Apr. 17, 1923.
W. C. ZENGERLE
1,451,858
CRADLE OR CREEPER FOR AUTOMOBILE WORK
Filed Feb. 17, 1922    2 Sheets-Sheet 1
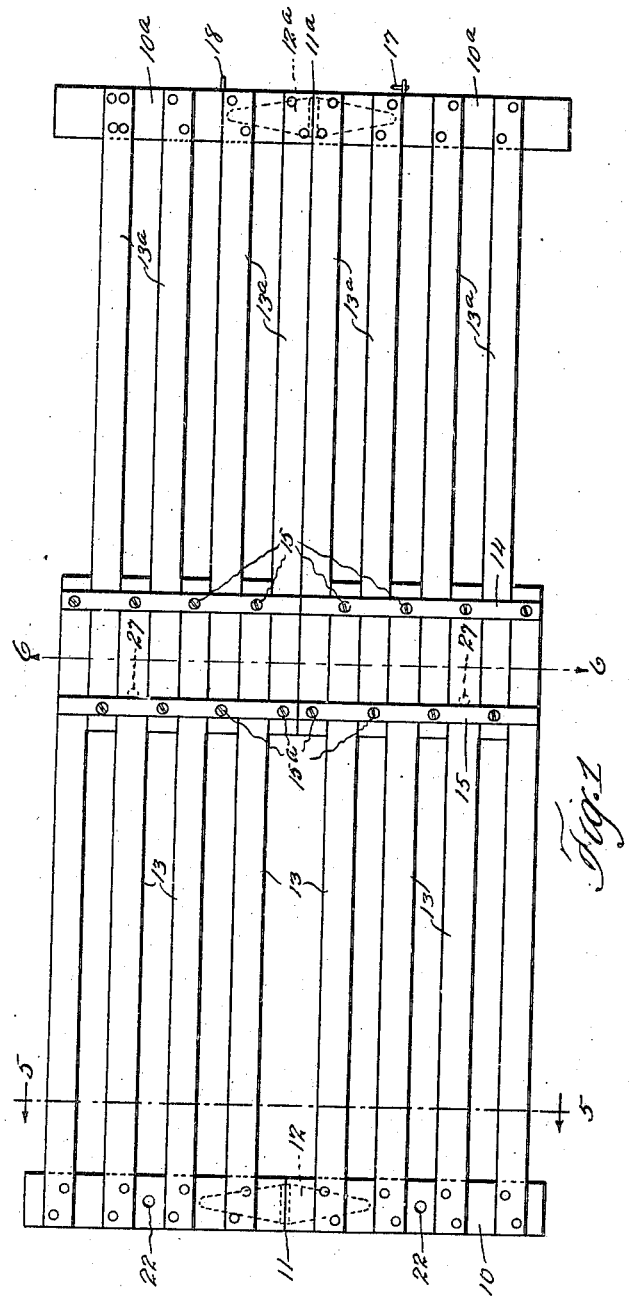
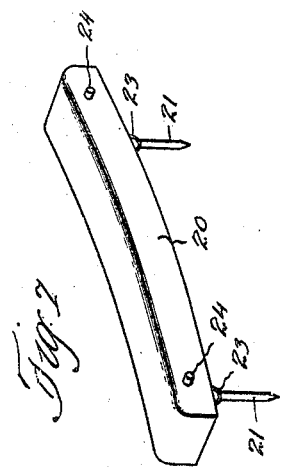
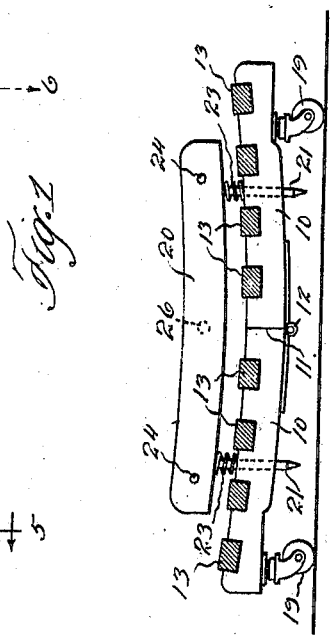
Inventor
W. C. Zengerle
By
Hull Brock & West
Attys.

Apr. 17, 1923.

W. C. ZENGERLE 1,451,858

CRADLE OR CREEPER FOR AUTOMOBILE WORK

Filed Feb. 17, 1922

2 Sheets-Sheet 2

Inventor
W. C. Zengerle
By
Hun Brock & West
Attys.

Patented Apr. 17, 1923.

1,451,858

UNITED STATES PATENT OFFICE.

WALTER C. ZENGERLE, OF CLEVELAND, OHIO, ASSIGNOR TO FRANZENGERLE COMPANY, OF CLEVELAND, OHIO, A PARTNERSHIP COMPOSED OF WALTER C. ZENGERLE AND OSCAR FRANZEN.

CRADLE OR CREEPER FOR AUTOMOBILE WORK.

Application filed February 17, 1922. Serial No. 537,181.

*To all whom it may concern:*

Be it known that I, WALTER C. ZENGERLE, a citizen of the United States, residing at Cleveland, in the county of Cuyahoga and State of Ohio, have invented a certain new and useful Improvement in Cradles or Creepers for Automobile Work, of which the following is a full, clear, and exact description, reference being had to the accompanying drawings.

This invention relates generally to cradles for working beneath automobiles and like articles and has for its object to provide a full sized cradle which can be folded into a small compass when not in use so that it can be conveniently carried beneath the seat of the car or in the boot or rear deck thereof.

Another object of the invention is to provide a brake mechanism or anchoring device to prevent the cradle from rolling when so desired, as when the operator is using a wrench with one or both hands.

With these objects in view, and certain others which will become apparent as the description proceeds, the invention consists broadly in constructing the cradle of two hinged sections, which sections can be extended or contracted as desired and which when contracted can be folded into compact form. The invention consists also in providing a head rest for normally supporting the head while the workman is resting upon the cradle and which can be utilized as a brake or anchoring device to prevent the cradle from rolling. The invention consists also in certain details of construction, all of which will be fully described hereinafter and pointed out in the claims.

Figure 2:
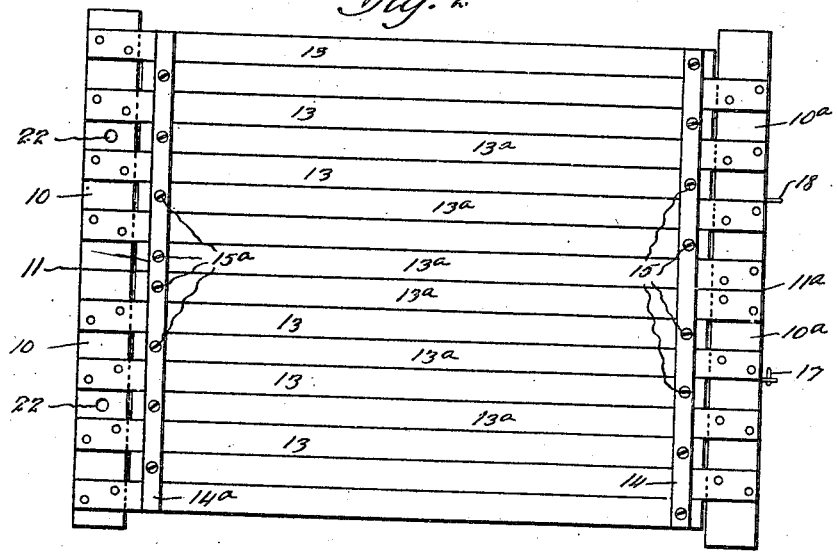
Figure 3:
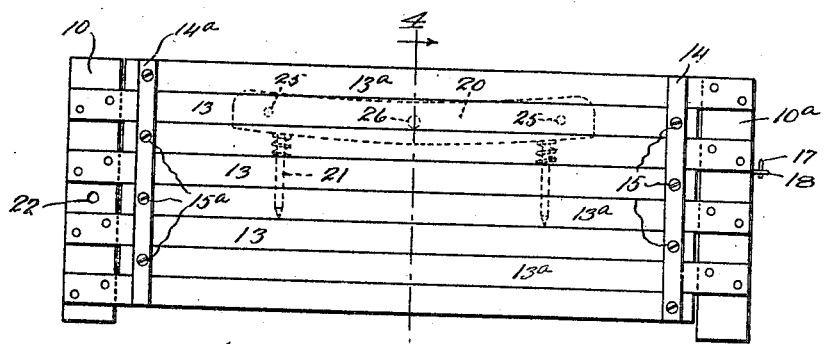
Figure 4:
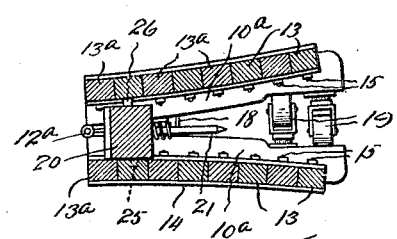
Figure 6:
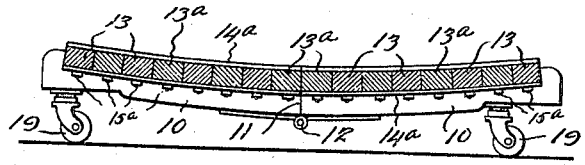

In the drawings forming a part of this specification, Fig. 1 is a top plan view of the cradle in extended or working position, the head rest being omitted for clearness of illustration; Fig. 2 is a plan view of the cradle in contracted position; Fig. 3 is an elevation of the cradle in contracted and folded position, the head rest being shown in dotted lines; Fig. 4 is a sectional view of the contracted and folded cradle taken on the line 4—4 of Fig. 3; Fig. 5 is a sectional view taken on the line 5—5 of Fig. 1, the headrest being shown in elevation; Fig. 6 is a section taken on the line 6—6 of Fig. 1 and Fig. 7 is a detail perspective view of the head rest.

In constructing a cradle in accordance with my invention I employ two end sills 10 and 10$^a$ which are divided at 11 and 11$^a$ and united by hinges 12 and 12$^a$ respectively placed upon the undersides thereof and these sills are curved slightly as shown so that the sides of the cradle would be somewhat higher than the central portion. Securely connected at their outer ends to the sills 10 and 10$^a$ are the longitudinal strips 13 and 13$^a$, the upper faces of the sills being preferably mortised to receive said strips which are arranged alternately as shown and have their inner ends secured between the flat metallic bars 14 and 14$^a$ respectively, and arranged in pairs, bolts 15 and 15$^a$ passing respectively through the strips 13 and 13$^a$ and the bolts 15 and 15$^a$ and provided with nuts 16 and 16$^a$ upon their lower ends. If desired, rivets can be employed for securely connecting the parts together. In this manner easy sliding or telescoping of the strips is provided.

By constructing the cradle in this manner it will be possible to readily extend the same to a full length cradle as shown in Fig. 1 or it can be contracted as shown in Fig. 2 by pushing the sills towards each other and then if desired the contracted device can be folded centrally as shown in Figs. 3 and 4 and when thus contracted and folded will occupy so little space that it can be conveniently carried beneath the seat of the car or in the boot or rear deck thereof and a hook 17 and eye 18 attached to the sill sections can be employed to secure the parts in their folded positions. The cradle is supported upon four casters 19 so that it can be freely rolled about while the person is resting thereon and in practice I prefer to place the casters on one side near the end of the sill and on the other side set them back a short distance so that in folding, the casters will not contact with each other but will rest side by side, and I also prefer to cut away each sill upon the underface at each end so that space will be provided for the casters and the sections can be more closely folded as most clearly shown in Fig. 4. A head rest 20 is detachably mounted at one end of the cradle for supporting the head of the operator when resting upon the cradle and this head rest is slightly curved or bowed at the center. It is connected to the sill by means of pins 21 rigidly attached to the headrest and extending through holes 22 bored in the sills, and coil springs 23 surround the upper portions of the pins and bear upon the upper face of the sill when the head rest is in place and thus yieldingly support the head rest.

The pins 21 are of such length that their lower ends project through the sill and the extreme ends are pointed so that in case the operator wishes to anchor the cradle against rolling (as when using a wrench) it can be accomplished by pressing with the head downwardly upon the head rest, compressing the springs 22 and forcing the pins downwardly so that their pointed ends contact with the floor or ground upon which the cradle rests and thus check the rolling movement of the cradle. When pressure is relieved the springs lift the headrest to its normal position and withdraw the anchoring pins from engagement with the floor or ground. The head rest is also provided with laterally projecting dowels 24 which fit into sockets 25 produced in the underside of one of the strips 13ª and at the opposite side of the head rest there is provided a spacing pin 26 which contacts with one of the spacing strips 13ª of the other section and aids in holding the head rest in position between the folded sections as most clearly shown in Figs. 3 and 4. Stops 27 are placed upon the undersides of two or more of the strips 13 for contacting with the under metal bars 14 thereby limiting the extent to which the strips can be moved and maintaining the metallic bars in parallel spaced relation adjacent the transverse center of the cradle and giving the same the required strength at that point, the strips being supported not only at their extreme inner ends but also at points adjacent said inner ends. In use the sections are folded out flat and extended and the head rest is then placed in position and the device is ready to be rolled beneath the car or other object with the operator thereon and so long as freedom of movement is desired the head of the operator will rest in a natural manner upon the head rest but should the operator wish at any time to check the rolling movement of the cradle it is only necessary to exert downward pressure upon the head rest thereby projecting the anchoring pins into the floor or ground and braking or anchoring the cradle against rolling movement.

When not in use the cradle is contracted as shown in Fig. 2, the head rest removed and the sections are folded together, the head rest being previously placed between the sections and after being folded as shown in Figs. 3 and 4, the parts are secured by the hook and eye.

It will thus be seen that I provide an exceedingly cheap, simple and durable construction of cradle which can be folded when not in use and it will also be seen that in connection with the cradle I provide a spring supported head rest which can also be utilized for braking or checking the rolling movement of the cradle.

Having thus described my invention, what I claim is:

1. A cradle having a head rest supported at one end thereof and means connected with said head rest for preventing motion of the cradle, said means being brought into operation by downward pressure of the head upon said head rest.

2. An extensible cradle provided with casters at the corners thereof, and a spring supported head rest at one end, said head rest having an anchoring pin projecting therefrom, and adapted to be brought into engagement with the ground to prevent rolling of the cradle.

3. A cradle having a head rest at one end thereof, said head rest being vertically movable and provided with an anchoring pin adapted to engage a surface and arrest rolling movement of the cradle.

4. A cradle having a detachable head rest at one end, said head rest having one or more anchoring pins projecting through the end of the cradle and adapted to engage the floor or ground to arrest rolling motion, said rest being normally supported to hold said pin or pins out of engagement with the floor or ground.

5. A cradle having a head rest connected thereto, said head rest having a portion capable of being brought into contact with the ground by downward pressure of the head upon the head rest.

6. A cradle, a head rest detachably connected to said cradle and spring supported, said head rest being downwardly movable by head pressure to bring a part thereof into contact with the ground.

In testimony whereof, I hereunto affix my signature.

WALTER C. ZENGERLE.